United States Patent [19]

Tardoskegyi

[11] 3,960,350
[45] June 1, 1976

[54] SHOCK-RESISTING HANGER SYSTEMS AND SUSPENDED ASSEMBLIES

[75] Inventor: Louis V. Tardoskegyi, Montreal, Canada

[73] Assignee: Electrovert Ltd., Montreal, Canada

[22] Filed: Nov. 27, 1973

[21] Appl. No.: 419,376

[52] U.S. Cl. ............................ 248/54 R; 248/59; 248/68 R
[51] Int. Cl.² ........................................ F16L 3/00
[58] Field of Search .............. 248/59, 58, 54 R, 49, 248/15, 18, 327, 70, 73, 323, 324, 68 R, 63, 225, 358 AA, 291, 54 CS; 174/68 C, 72 A; 138/107

[56] References Cited
UNITED STATES PATENTS

| | | | |
|---|---|---|---|
| 1,100,792 | 6/1914 | Storer | 248/58 X |
| 1,374,865 | 4/1921 | Sherwood | 248/59 X |
| 1,653,385 | 12/1927 | Beggs | 248/54 R X |
| 2,096,621 | 10/1937 | Skolfield | 248/15 X |
| 2,375,513 | 5/1945 | Bach | 248/59 |
| 2,632,632 | 3/1953 | Downs | 248/59 X |
| 2,856,146 | 10/1958 | Lehder | 248/291 |
| 2,880,949 | 4/1959 | Fuss | 248/73 X |
| 2,929,397 | 3/1960 | Sloan et al. | 248/54 R X |
| 3,035,800 | 5/1962 | McLeod | 248/68 R |
| 3,137,468 | 6/1964 | Meinders | 248/49 |
| 3,162,723 | 12/1964 | McCurtain | 248/54 R X |
| 3,317,124 | 5/1967 | Morrill | 248/358 R |
| 3,650,498 | 3/1972 | Deak | 248/54 CS X |
| 3,812,660 | 5/1974 | Vandenhoeck | 248/327 X |

*Primary Examiner*—Roy D. Frazier
*Assistant Examiner*—Rodney H. Bonck

[57] ABSTRACT

A shock-resisting suspended cable trough assembly includes open channel supporting members extending transversely beneath the trough. At their ends, the channel members are formed with box channel end portions and the upper and lower webs of those box channel end portions are formed with aligned and open-ended slots to receive the threaded lower ends of generally vertical legs of respective hangers. At its upper end, each hanger is formed with a generally horizontal arm which is received in an opening in a mounting bracket depending from an overhead support so that the arm is generally parallel to the longitudinal direction of the trough. The arm of each hanger forms an integral extension of one limb of a generally horizontal U-shaped intermediate portion while the other limb of such U-shaped portion is integrally formed with the upper end of the leg of the hanger through an elbow. The flanges defining the slots in the upper webs of the box channel end portions are usefully terminally and upwardly upset so as to engage an upper one of two nuts threaded on the lower end of a respective hanger leg in turn to prevent accidental disengagement of that hanger leg from the box channel.

9 Claims, 4 Drawing Figures

3,960,350

SHOCK-RESISTING HANGER SYSTEMS AND SUSPENDED ASSEMBLIES

BACKGROUND OF THE INVENTION

The present invention relates generally to shock-resisting hanger systems, hangers for use in such systems, and to shock-resisting suspended assemblies incorporating such hanger systems. More particularly, this invention relates to shock-resisting hanger systems especially suited for use in mounting cable troughs and other elongated structures such as conduits and ducting, and to suspended assemblies incorporating such hanger systems. The hangers of the present invention can also be used for suspending units such as tanks and boxes.

In military installations, such as fighting ships, it is generally desirable to provide hanger systems for cable troughs, conduits, ducting and the like and which systems are shock-resisting. Although shock-resisting systems have previously been suggested, many such known hanger systems have presented certain practical disadvantages. For example, some of the known hanger systems intended for such a particular application have incorporated springs or other relatively complex and expensive structures to provide the desired shock-resisting and shock-absorbing characteristics. Others of the known hanger systems are relatively bulky, occupy valuable space, and are not easily replaced if damaged or destroyed.

It is accordingly a principal object of this invention to provide a shock-resisting hanger system especially suited for use in military installations such as fighting ships and presenting several practical advantages when compared to the hanger systems previously known.

Other objects of the invention will become apparent as the description herein proceeds.

SUMMARY OF THE INVENTION

Broadly, a shock-resisting hanger in accordance with this invention can be defined as comprising an upstanding leg adapted at its lower end for detachable engagement with a structure to be suspended by said hanger from an overhead support, an arm at the upper end of said hanger, said arm having a major axis and being adapted to be received in an opening in an overhead support and extending angularly relative to said leg of said hanger, and an intermediate portion interconnecting said leg and said arm of said hanger, whereby, when said arm of said hanger is so received in such an opening in an overhead support, said hanger can be pivotally moved about the major axis of such arm toward and away from the structure supported by the hanger.

A shock-resisting hanger system in accordance with this invention is broadly defined as comprising a support member intended to be disposed in supporting relationship to a structure to be suspended by said hanger system; and a hanger in turn comprising: an upstanding leg adapted at its lower end for detachable engagement with said support member; an arm at the upper end of said hanger, said arm having a major axis and being adapted to be received in an opening in an overhead support and extending angularly relative to said leg of said hanger; and an intermediate portion interconnecting said leg and said arm of said hanger, whereby, when said arm of said hanger is so received in such an opening in an overhead support, said hanger can be pivotally moved about the major axis of said arm toward and away from a structure supported by said support member.

Although the hanger systems of this invention are principally intended for mounting cable troughs, it is equally within the scope of this invention to utilize such hanger systems for the suspension mounting of other structures.

Consequently, a shock-resisting suspended assembly in accordance with this invention can broadly be defined as comprising a suspended structure; a support member disposed in supporting relationship to said supporting structure; and a hanger detachably connected to said support member and which hanger comprises an upstanding leg detachably secured at its lower end to said support member; an arm at the upper end of said hanger, said arm having a major axis, being received in an opening in an overhead support and extending angularly relative to said leg of said hanger; and an intermediate portion interconnecting said leg and said arm of said hanger, whereby said hanger can be pivotally moved about said major axis of said arm between a first supporting position in which said leg of said hanger is detachably secured to said support member and a released position angularly spaced apart from said supporting position.

Various preferred features for the hangers and systems of this invention and details of the practical advantages presented by the hangers and systems of this invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
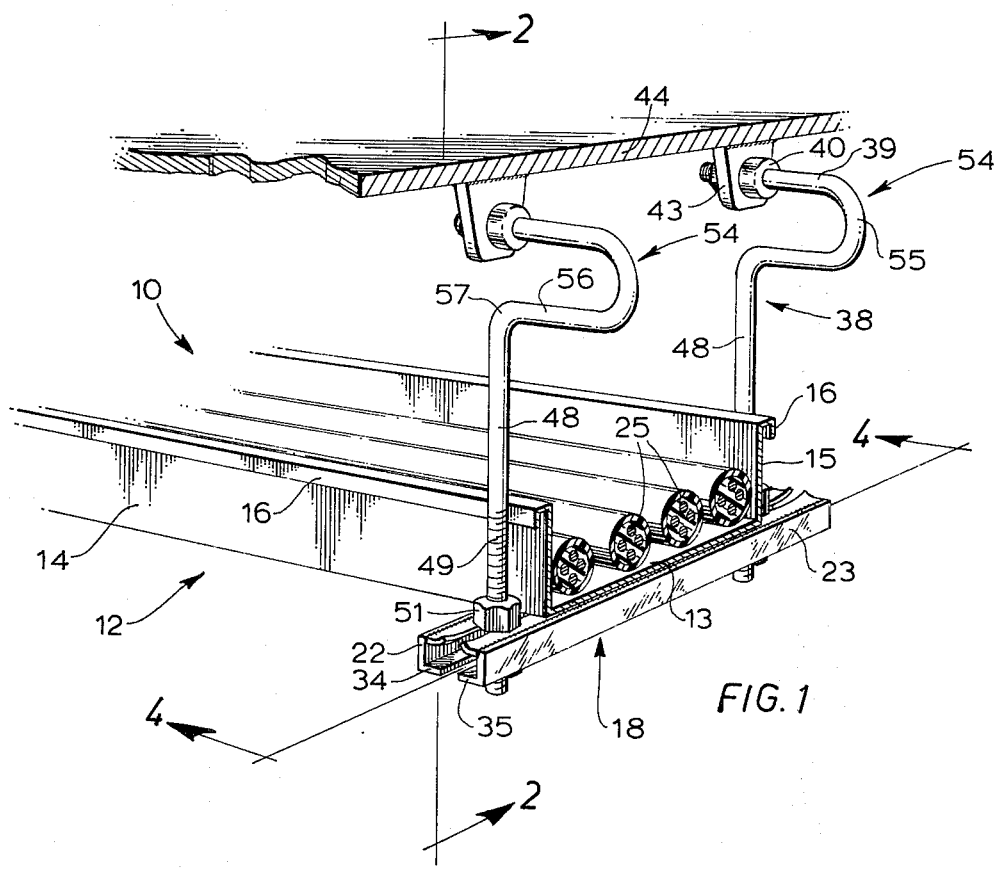
FIG. 1 is a fragmentary perspective view of one embodiment of a shock-resisting suspended assembly in accordance with this invention and showing a cable trough suspended from an overhead support by the novel hanger system of the invention.

There is shown generally at 10 in the accompanying drawings one embodiment of a shock-resisting suspended assembly in accordance with the present invention.

The suspended assembly 10 includes a cable trough generally indicated at 12 and having a base 13, mutually separated and longitudinally parallel upstanding side rails 14 and 15 which are integrally formed with the base 13, the trough 12 being of conventional construction. Along their upper edges, the side rails 14 and 15 are formed with downturned edge flanges 16.

At suitably spaced apart positions along the trough 12, there are provided transversely below the trough 12 support members, as exemplified by the transverse support member generally indicated at 18, and which members are in the form of generally rectangular sectioned open channel members having webs 21 and side walls 22 and 23.

Figure 4:
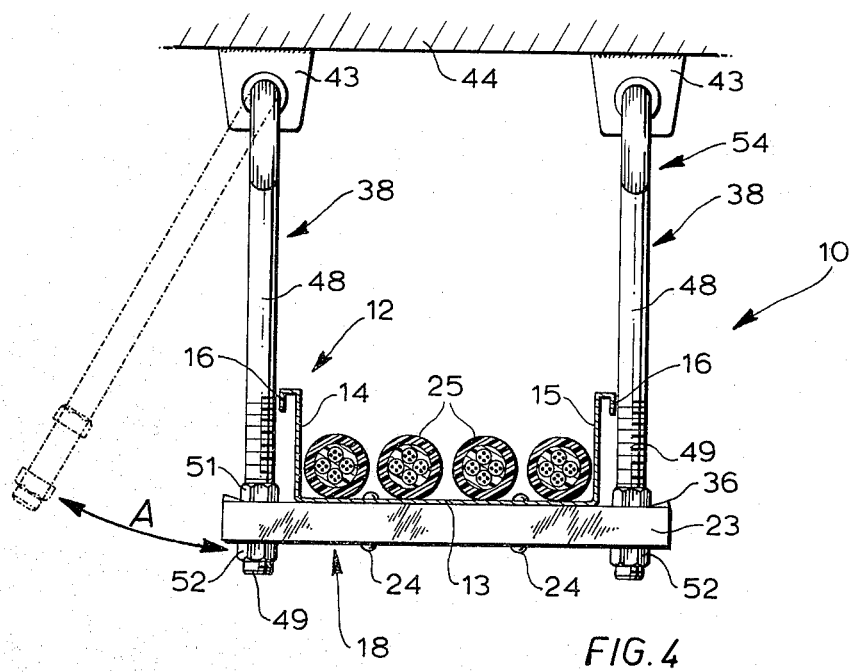
FIG. 4 is a transverse sectional elevation through the assembly shown in FIG. 1 when viewed as indicated by the arrows 4—4 of that figure and showing in broken lines one of the hangers of the assembly swung away from the cable trough into its released position to permit ready access to the contents of that trough.

The transverse support member 18 is as shown in FIG. 4 secured to the base 13 of the trough 12 by rivets 24 although it is equally within the scope of this invention to use other means of securement or simply to support a trough on such transverse support members without any actual attachment thereto. Cables 25 are shown supported in the trough 12 merely by way of illustration in FIGS. 1 and 4.

Figure 3:
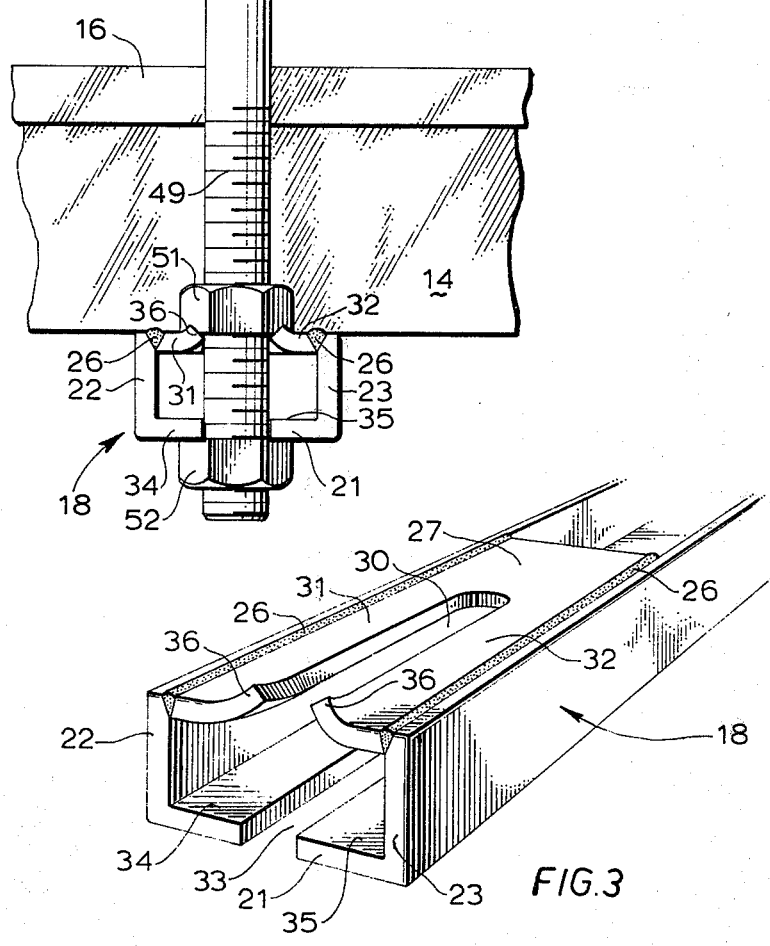
FIG. 3 is an enlarged and fragmentary perspective view of one end of one of the transverse support members of the assembly shown in the preceding figures.

At each of its ends, each of the transverse support members is provided, for example, by welding as indicated at 26 and as will best be understood by reference to FIG. 3, with an upper web plate 27 including a generally central and transversely extending and open-ended slot 30 defined by flanges 31 and 32. An aligned and open-ended slot 33 defined by flanges 34 and 35 is similarly provided at each end of the base web 21 of each of the transverse support members 18. The flanges 31 and 32 are upwardly upset, for a purpose yet to be explained and as indicated as at 36 at the outer ends of their opposed edges as will best be understood by reference to FIG. 3.

Along each side of the trough 12, there are provided hangers, each generally indicated at 38 for detachable engagement with respective ends of respective ones of the support members 18 in a manner yet to be explained.

Each of the hangers 38 includes at its upper end a generally horizontal arm 39 which is integrally formed with an annular collar 40 and which includes a threaded end portion 41 which can be passed through an opening 42 provided in a bracket 43 suitably secured to, for example, by welding, and depending from an overhead support member 44. A nut 45 screws onto the threaded end portion 41 of the arm 39 pivotally to secure the hanger 38 in position. It will be noted from FIG. 4 that the hanger 38 can be pivoted as indicated by the arrow A about an axis essentially corresponding to the longitudinal axis of the arm 39 and which axis is essentially parallel to the longitudinal direction of the trough 12.

Each hanger 38 also comprises an upstanding or generally vertical leg 48 formed with a threaded lower end portion 49 which is dimensioned so as to be received in the elongated slots 30 and 33 in the box channel end portion of a respective one of the support members 18. Upper and lower locking members or nuts 51 and 52 are screwed onto the threaded end portion 49 of each leg 48 so that, after pivoting the hanger 38 into the solid line operative position shown for the left-hand hanger 38 in FIG. 4, those nuts can be tightened to retain the leg in position so that it extends through the slots 30 and 33, the aforementioned upset end portions 36 of the flanges 31 and 32 serving to minimize the risk of accidental disengagement of the hanger 38 from that support member 18.

The aforementioned horizontal arm 39 of the hanger 38 is integrally formed as an extension of an upper limb of a generally horizontal U-shaped intermediate portion generally indicated at 54 of the hanger 38 and which includes a base web 55 and a lower limb 56, that lower limb 56 being integrally formed with the upper end of the leg 48 through an elbow 57.

Having described the structure of the assembly shown in the accompanying drawings, the manner of use of that assembly will now be briefly summarized.

To install the assembly, the hangers 38 are first loosely secured in the brackets 43 using the nuts 45 in the manner already described. The trough 12 with the supporting members or channel members 18 previously riveted thereto is then raised into position and the hangers 38 are pivoted so that their legs 48 are received in the aligned slots 30 and 33 in the ends of respective ones of the transverse support members 18. The nuts 51 and 52 are then tightened and, after tightening the nuts 45 on the threaded end portions 41 of the arms 39, the installation of the assembly is complete.

The assembly already specifically described herein presents several practical advantages. In the first place, it has a particularly simple and inexpensive construction; it is very easily installed and is relatively compact in its construction.

The provision of the U-shaped intermediate portions 54 in the hangers 38 provides good shock-resistance and, in the event that one or more of the hangers 38 are damaged or destroyed, such a damaged or destroyed hanger is easily replaced using conventional hand tools. The risk of accidental disengagement of the hangers 38 from the transverse support members 18 is also substantially lessened by the provision of the aforementioned upset portions 36 at the ends of the flanges 30 and 32.

The assembly shown in the accompanying drawings also presents the further advantage that it permits ready access to the contents of the trough 12. For example, cables supported in that trough such as those shown at 25 in FIG. 4 are easily removed or replaced simply by releasing the nuts 51 and 52 and loosening the nuts 45 slightly on selected ones of the hangers 38 and then pivoting those hangers 38 away from the trough, for example, into the position shown in broken lines in FIG. 4.

Another important advantage of the system shown in the accompanying drawings is that, by adjusting the nuts 51 and 52 along the threaded lower portions 49 of the hangers 38, the vertical position of the cable trough 12 can easily be adjusted.

As a result of the pivotal mounting of the hangers 38, those hangers can also, if desired, when not in use, be pivoted upwardly against the overhead support member 44 for possible future use. It is not necessary to remove the hangers from the overhead support.

Figure 2:
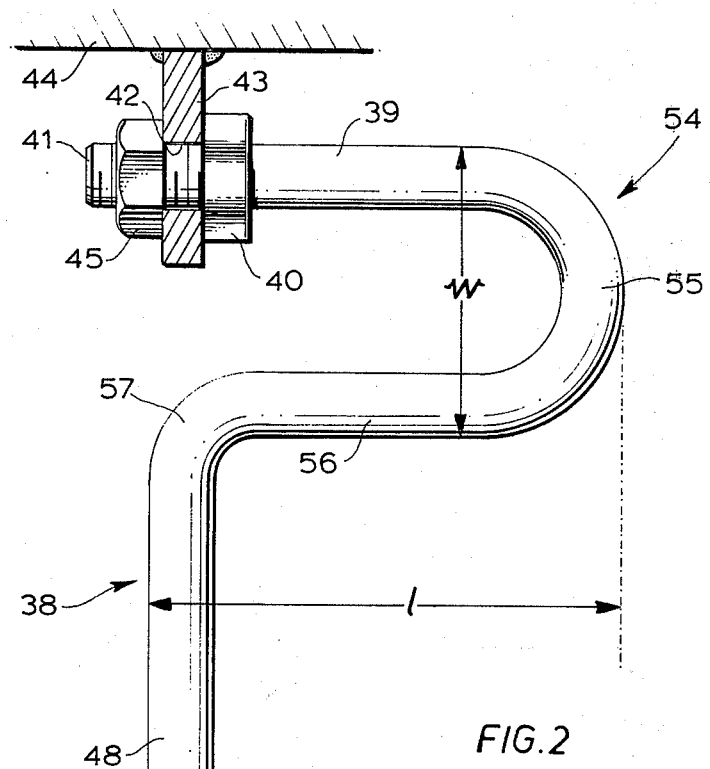
FIG. 2 is an enlarged side elevation when taken as indicated by the arrows 2—2 of FIG. 1 with certain parts shown in section and the cable trough shown fragmentarily.

The dimensions of the U-shaped intermediate portion of the hanger 38 will depend on the shock absorbency which is desired. For example, particularly satisfactory characteristics have been obtained when the hangers 38 hereinbefore specifically described were formed as integral structures of 0.625 inch diameter mild steel rod with the U-shaped portion 54 of such a hanger (FIG. 2) having an overall external length (l) of about 4.625 inches and a width (w) of about 2.625 inches.

Although the invention has hereinbefore been specifically described with reference to the particular embodiment thereof as shown in the accompanying drawings, it will be understood that numerous variations and modifications are possible. It is, for example, possible to use the described hanger system for supporting structures other than cable troughs, such as conduits, ducting, boxes, tanks and the like. If desired, the improved hangers of this invention might be used along only one side of a cable trough or other elongated member although the additional advantage obtained by using such hangers along both sides of such a structure will be readily apparent.

What is claimed is:
1. A shock-resisting hanger system which comprises:
a support member intended to be disposed in supporting relationship to a structure to be suspended by said hanger system and including a terminally slotted web including mutually spaced apart flanges defining an open ended slot, opposed edges of said mutually spaced apart flanges at an end of said support member being terminally and upwardly upset; and
a hanger in turn comprising a rod having:
a substantially straight leg removably received in said slot inwardly of said end portions of said flanges and having an upper end and a lower free end;
upper and lower mutually spaced apart locking members on said leg adjacent the free end thereof and receiving said support member therebetween, at least one of said locking members being axially movable along said leg to detachably secure said support member to said leg;
an intermediate shock-resisting portion comprising a generally horizontal U-shaped element having a lower limb extending annularly away from the upper end of said leg, an upper limb spaced from said lower limb and a curved base web merging smoothly into said upper and lower limbs;
an arm comprising an integral extension of the upper limb of the intermediate portion and adapted to be received in an opening in an overhead support; and
means on said upper arm for detachably securing said arm to said overhead support.

2. A hanger system as claimed in claim 1 and in which said upper and lower locking members are threaded onto said lower end of said leg of said hanger.

3. A hanger system as claimed in claim 1 in which said support member is in the form of a channel member with a box channel end portion including spaced apart upper and lower webs, said terminally slotted web being constituted by said upper web of said box channel end portion, and in which an aligned and open-ended slot is provided in said lower web of said box channel end portion.

4. A shock-resisting hanger system as claimed in claim 3 wherein said hanger is a first hanger, said system further comprising a second hanger substantially identical with said first hanger, said support member being suspended from said overhead support by said first and second hangers said first and second hangers being detachably connected to said support member generally at opposite ends thereof.

5. A hanger system as claimed in claim 3 and in which said arm of said hanger is terminally threaded for receiving a nut for pivotally securing said hanger in an opening in an overhead support.

6. A hanger system as claimed in claim 5 and in which said upper and lower locking members are threaded onto said lower end of said leg of said hanger.

7. A shock-resisting suspended assembly as claimed in claim 4 and in which said suspended structure comprises a cable trough.

8. A shock-resisting suspended assembly as claimed in claim 7 and in which said support member extends transversely beneath said cable trough in supporting relationship thereto.

9. A shock-resisting suspended assembly as claimed in claim 8 and in which said cable trough is permanently secured to said support member.

* * * * *